(12) United States Patent
Koukouravas

(10) Patent No.: US 7,708,055 B2
(45) Date of Patent: May 4, 2010

(54) AIR-CONDITIONER HOUSING

(75) Inventor: Evripidis Koukouravas, Neckartenzlingen (DE)

(73) Assignee: BEHR GmbH & Co. KG, Stuttgart (DE)

( * ) Notice: Subject to any disclaimer, the term of this patent is extended or adjusted under 35 U.S.C. 154(b) by 752 days.

(21) Appl. No.: 10/522,743

(22) PCT Filed: May 28, 2003

(86) PCT No.: PCT/EP03/05612

§ 371 (c)(1),
(2), (4) Date: Jan. 28, 2005

(87) PCT Pub. No.: WO2004/014677

PCT Pub. Date: Feb. 19, 2004

(65) Prior Publication Data

US 2005/0257925 A1 Nov. 24, 2005

(30) Foreign Application Priority Data

Jul. 29, 2002 (DE) .............................. 102 35 513
Dec. 17, 2002 (DE) .............................. 102 61 036

(51) Int. Cl.
*B60H 1/00* (2006.01)

(52) U.S. Cl. .................... 165/204; 165/202; 165/42; 454/160

(58) Field of Classification Search .................... 165/42, 165/43, 44, 202, 203, 204; 454/160
See application file for complete search history.

(56) References Cited

U.S. PATENT DOCUMENTS

| 4,586,652 | A |   | 5/1986 | Sakurai |
|-----------|---|---|--------|---------|
| 5,211,604 | A | * | 5/1993 | Fujiki .......................... 454/160 |
| 6,470,960 | B2 | * | 10/2002 | Kampf et al. .................. 165/42 |
| 6,994,157 | B1 |   | 2/2006 | Arold |
| 2006/0151162 | A1 | * | 7/2006 | Kiel et al. .................... 165/204 |

FOREIGN PATENT DOCUMENTS

| DE | 39 40 361 A1 | 6/1991 |
| DE | 198 12 233 A1 | 12/1998 |
| DE | 198 04 287 C1 | 3/1999 |
| EP | 1 205 321 A2 | 5/2002 |
| EP | 1 225 071 A1 | 7/2002 |
| JP | 60-248421 A | 12/1985 |
| JP | 11-011135 A | 1/1999 |

* cited by examiner

*Primary Examiner*—Ljiljana (Lil) V Ciric
(74) *Attorney, Agent, or Firm*—Foley & Lardner LLP

(57) ABSTRACT

An air-conditioner housing comprising an evaporation device, a heating device, and a mixing chamber, out of which air flows to the rear footwell while serving to ventilate the rear passenger compartment. The air-conditioner housing also comprises an air control device that uses mixing flaps to control the air flowing via the evaporation device and the heating device into the mixing chamber. The air-conditioner housing has a separate stratification duct through which cool air can be guided into the ventilation area of the rear passenger compartment.

7 Claims, 1 Drawing Sheet

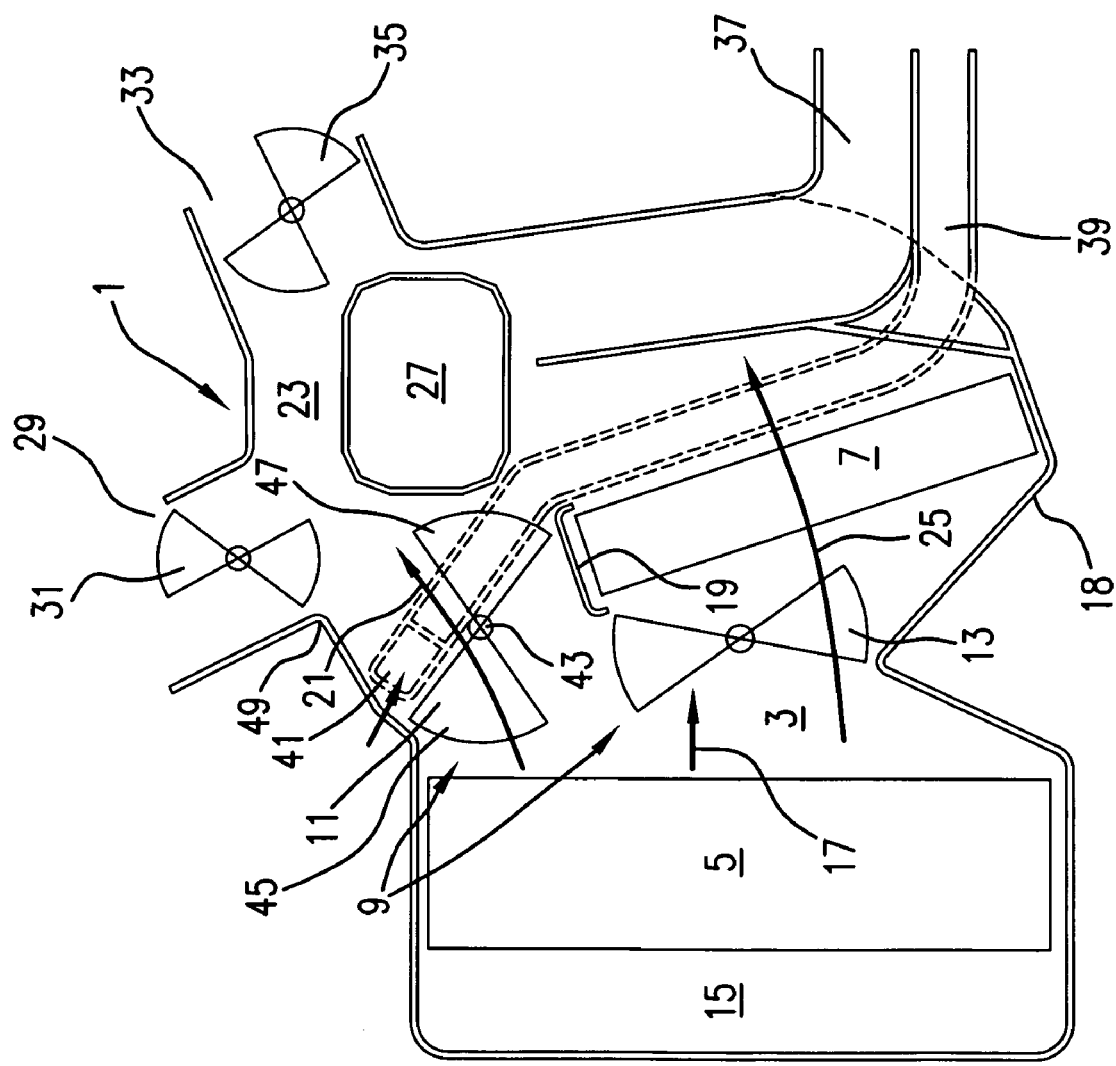

AIR-CONDITIONER HOUSING

The invention relates to an air conditioner housing according to the preamble of claim 1.

Air conditioner housings of the type referred to here are used especially in connection with vehicle air conditioning systems which serve for the heating and air conditioning of the vehicle interior. When air conditioning systems of this type are used, the aim is to achieve temperature stratification, by means of which the temperature can be set higher in the foot space than in the case of the region of the upper body or head of a vehicle occupant. The aim, therefore, with the aid of the air conditioning system, is to implement temperature stratification and bring a lower region of a vehicle to a temperature other than that in an upper region.

Known air conditioner housings contain an evaporation device, a heating device and an air control device which serves for forming air flow paths inside the air conditioner housing and for leading these into a mixing chamber, out of which the air is conducted into various regions of, for example, a vehicle interior. The air flowing out of the air conditioner housing is heated and cooled to a greater or lesser extent, in order to supply various regions of the vehicle, that is to say the front region or the rear part, with air streams of different temperature. In order to implement temperature stratification in the rear part, air guide ribs in the air stream have already been provided, but the result of these is that a relatively high noise level is established and the discharged air quantity is reduced.

The object of the invention is, therefore, to provide an air conditioner housing which allows temperature stratification fittings.

To achieve this object, an air conditioner housing is proposed which has the features mentioned in claim 1. The air conditioner housing is distinguished by a separate stratification duct through which cool air can be led into the region of ventilation of the rear part. Since the cool air is conducted into the region of the rear part through a specific duct, controlled influence on temperature, in particular the discharge of cooler air, is possible here, without any fittings being introduced into the region of the flowing air. An additional generation of noise and a reduction in air quantity can thereby be effectively prevented.

An exemplary embodiment of the air conditioner housing is preferred, in which the issue of the stratification duct is arranged in the region of a mixing flap of the air control device. This may be used to influence the temperature of the air flowing into the stratification duct.

An exemplary embodiment of the air conditioner housing is especially preferred which is distinguished in that, in one functional position of the mixing flap, the issue of the stratification duct is connected only to the mixing chamber or can be acted upon only by the air delivered by the evaporation device. Thus, on the one hand, the supply of additional cold air can be interrupted completely. However, it is also possible to conduct only air delivered by the evaporation device into the region of ventilation of the rear part via the stratification duct and consequently to ensure maximum additional cooling.

Finally, an exemplary embodiment of the air conditioner housing is preferred which is distinguished in that, in one functional position of the mixing flap, the issue of the stratification duct is closed off by said mixing flap both with respect to the mixing chamber and with respect to the cold air delivered by the evaporation device.

The invention is explained in more detail below with reference to the drawing:

The single FIGURE shows a basic diagram of an air conditioner housing 1 in section, so that the interior 3 of the latter can be seen. The left side of the air conditioner housing 1, when the latter is installed in a motor vehicle, points, for example, in the direction of travel. Provided in the interior 3 are an evaporation device 5, a heating device 7 and an air control device 9. The latter comprises a first mixing flap 11 and a second mixing flap 13.

The evaporation device 5 is introduced into the air conditioner housing 1 in such a way that air which flows into an inflow region 15 and which is conveyed forward, for example, by a blower, not illustrated here, flows solely through the evaporation device 5, cold air flowing out of the latter, as indicated by an arrow 17. The heating device 7 here bears, on the one hand, against the wall 18 of the air conditioner housing 1 and, on the other hand, against a wall portion 19. The latter is at a distance from an opposite region of the air conditioner housing 1, so as to form here a first air flow path 21, indicated by an arrow, which is uninfluenced by the heating device 7. The first air flow path 21 passes from the evaporation device 5 via the air control device 9, here via the first mixing flap 11, into a mixing chamber 23.

A second air flow path 25, indicated by an arrow, runs from the evaporation device 5 via the air control device 9, here via the second mixing flap 13, through the heating device 7 into the mixing chamber 23.

The second mixing flap 13 is designed in such a way that it spans, inside the air conditioner housing 1, a region located upstream of the heating device 7 in the flow direction and, in a first functional position reproduced in the FIGURE, interrupts the second air flow path 25. That is to say: in this functional position of the second mixing flap 13, no air can pass from the evaporation device 5 through the heating device 7. It is therefore not possible for cold air from the evaporation device 5 to be heated by means of the heating device 7.

The first mixing flap 11 is correspondingly designed in such a way that it can span, inside the air conditioner housing 1, a region into which is introduced the first air flow path 21 which lies between the wall portion 19 and the housing wall of the air conditioner housing 1. In a first functional position, illustrated here, the first mixing flap 11 can close off the free space between the wall 18 of the air conditioner housing 1 and the wall portion 19, so that the first air flow path 21 is interrupted.

When the two mixing flaps 11 and 13 are displaced into the functional position illustrated here, no air can pass out of the inflow region 15 into the mixing chamber 23, and therefore no air is discharged by the air conditioner housing 1.

The first and the second mixing flap 11 and 13 are preferably controllable independently of one another.

Air flowing into the mixing chamber 23 can pass via a first outlet 27 to the foot space of the region of the rear part of a vehicle and/or to the front region of this vehicle.

The air conditioner housing 1 may also have a second outlet 29 which leads, for example, to the deicer nozzles of a motor vehicle and is preferably provided with a specific regulating flap 31 which can regulate the air quantity flowing out of the second outlet 29. In the illustration given here, the regulating flap 31 is in a functional position in which no air can pass out of the mixing chamber 23 to the deicer nozzles, that is to say no air emerges from the second outlet 29.

The air conditioner housing 1 has a third outlet 33, via which air is conducted out of the mixing chamber 23 to the front ventilation. Here, too, a regulating flap 35 may be provided, which, as in the case of the regulating flap 31, serves for setting the air quantity flowing out of the mixing chamber 23. In the illustration chosen here, the regulating flap 35 is in a functional position in which no air passes out of the mixing chamber 23 to the front ventilation.

Finally, the air conditioner housing 1 has a fourth outlet 37 which leads to the ventilation of the rear part. Air introduced into the mixing chamber 23 can therefore pass via the fourth outlet 37 to the ventilation of the rear part.

It is also possible to provide here a regulating flap, such as described with reference to the second and the third outlet 29 and 33. Here, however, a regulating flap of this type is not provided. This may be provided, for example, directly in the region of the rear part itself.

A stratification duct 39 arranged here adjacently to the fourth outlet 37 also leads to the ventilation of the rear part. That end of the stratification duct 39 which is located opposite the fourth outlet 37 has an issue 41 which opens into the mixing chamber 23. That is to say, air can be conducted out of the mixing chamber 23 through the issue 41 and passes via the stratification duct 39 to the ventilation of the rear part, the air which enters the issue 41 being intermixed with the air which leaves the mixing chamber 23 and which emerges from the fourth outlet 37.

The stratification duct 39 thus forms a separate air path for air which is led out of the mixing chamber 23 to the ventilation of the rear part. In the exemplary embodiment illustrated here, the stratification duct 39 is led outside the air conditioner housing 1, this being indicated by the dashed illustration of the stratification duct 39.

The issue 41 cooperates with the air control device 9 in such a way that more or less cold air is introduced into the issue 41 and then passes via the stratification duct 39 to the region of ventilation of the rear part.

In the exemplary embodiment illustrated here, the issue 41 lies in the region of the first mixing flap 11. In the functional position, illustrated here, of the first mixing flap 11, in which the first air flow path 21 from the evaporation device 5 into the mixing chamber 23 is interrupted, only air from the mixing chamber 23 enters the issue 41. Thus, when ventilation is switched on, air is conducted out of the inflow region 15 into the mixing chamber 23. In the functional position, illustrated here, of the first mixing flap 11, air flowing through the evaporation device 5 can pass only through the open second mixing flap 13 and through the heating device 7 into the mixing chamber 23. For this purpose, the second mixing flap 13 is displaced out of the functional position illustrated in the FIGURE, so that the second air flow path 25 from the evaporation device 5 through the heating device 7 into the mixing chamber 23 is released.

Since the direct connection between the evaporation device 5 and the mixing chamber 23, to be precise the first air flow path 21, is interrupted by the first mixing flap 11, only air which emerges from the evaporation device 5 and has been heated by the heating device 7 passes into the mixing chamber 23.

In the functional position, illustrated here, of the first mixing flap 11, therefore, heated air passes out of the mixing chamber 23 into the issue 41 and via the stratification duct 39 to the ventilation of the rear part. At the same time, air from the mixing chamber 23 passes via the first outlet 27 to the foot space of the rear part. The foot space and the ventilation of the rear part are thus acted upon by heated air from the mixing chamber 23, the same temperature prevailing in the foot space and in the region of ventilation of the rear part. The ventilation of the rear part delivers the air at a height which is above the foot space.

The first mixing flap 11 is designed in such a way that, as stated, it spans the free space between the wall 18 of the air conditioner housing 1 and the wall portion 19. In the exemplary embodiment illustrated here, the first mixing flap 11 is pivotable about an axis of rotation 43 and has two symmetrical mixing flap regions 45 and 47. The mixing flap regions are of the design resembling a segment of a circle, the segments being arranged with their vertex at the axis of rotation 43 and bearing with their outside designed in the form of an arc of a circle and facing away from the axis of rotation 43 against the housing of the air conditioner housing 1, on the one hand, and against the wall 18, on the other hand, when the first mixing flap 11 is in the functional position illustrated here. The gap, present in the FIGURE, between the first mixing flap 11 and the wall 18 or the wall portion 19 is absent in an actual embodiment of the air conditioner housing 1, so that, as stated, in the functional position illustrated here, the first mixing flap 11 closes off the first air flow path 21 completely.

The issue 41 is located above the axis of rotation 43, while the mixing flap regions 45 and 47 are arranged on the right and on the left on the axis of rotation 43.

When the first mixing flap 11 is pivoted counterclockwise, the first mixing flap region 45 releases a gap between its outer face, in the form of an arc of a circle, of the first mixing flap region 45 and the wall 18 of the air conditioner housing 1, so that a flow path between the evaporation device 5 and the mixing chamber 23 is released, to be precise the first air flow path 21. During this rotation, the second mixing flap region 47 releases a gap with respect to the wall portion 19, so that, here too, cold air passes from the evaporation device 5 into the mixing chamber 23 and the first air flow path 21 can be implemented.

It becomes clear that, during a rotation of the first mixing flap 11 counterclockwise, air from the evaporation device 5 and also air from the mixing chamber 23 can pass into the issue 41.

When the first mixing flap 11 is rotated clockwise out of the position illustrated in the FIGURE, it is shown that the first mixing flap region 45 has such a selected width, that is to say forms such a large opening angle, the origin of which coincides with the axis of rotation 43, that it can close the issue 41 completely. In order to achieve this, the issue 41 must lie completely within the region which is swept by the first mixing flap region 45. That boundary of the issue 41 which is furthest away from the axis of rotation 43 must therefore be at a distance from the axis of rotation 43 which is smaller than or equal to the distance of the curved region of the first mixing flap region 45 from said axis of rotation.

When the first mixing flap 11 is rotated further clockwise, the outer edge, arranged at bottom left in the FIGURE, of the first mixing flap region 45 lies at top right on an imaginary connecting line between an edge 49 of the wall 18 of the air conditioner housing 1 and the axis of rotation 43. In this functional position, the issue 41 is closed off completely with respect to the mixing chamber 23 by the first mixing flap 11; at the same time, the first mixing flap region 43, together with the second mixing flap region 45, completely closes off the connection between the evaporation device 5 and the mixing chamber 23, so that the first air flow path 21 is interrupted. In this functional position, the connection between the evaporation device 5 and the issue 41 is released, so that air emerging from the evaporation device 5 can freely enter the issue 41.

The second air flow path 25 through the heating device 7 can be released to a greater or lesser extent by means of the second mixing flap 13. That is to say, cold air from the evaporation device 5, following only the second air flow path 25, can flow through the heating device 7, the quantity of heated air being adjustable by means of the first mixing flap 11. Thus, more or less cold air can be led out of the evaporation device 5 through the heating device 7 into the mixing chamber 23, while the issue 41 is closed off with respect to the mixing chamber 23 by means of the first mixing flap 11 and is freely connected to the evaporation device 5. Thus, in this functional position of the first and the second mixing flap 11 and 13, a particularly large amount of cold air will pass via the issue 41 into the stratification duct 39 and from there to the ventilation of the rear part.

It ultimately becomes clear that the first mixing flap 11 serves, on the one hand, for influencing the first flow path 21, that is to say for setting the quantity of air which passes directly from the evaporation device 5 into the mixing chamber 23. This air therefore does not run through the heating device 7, that is to say is not heated. The first mixing flap 11 serves at the same time for influencing the air flowing into the issue 41: in the functional position, illustrated in the FIGURE, of the first mixing flap 11, only air from the mixing chamber 23 passes into the issue 41 and consequently into the stratification duct 29. It is also possible, however, to close off the issue 41 completely, because the first mixing flap region 45 of the first mixing flap 11 is designed in the form of a segment of a circle. Finally, it is possible to rotate the first mixing flap 11 into a functional position in which the issue 41 is screened off with respect to the mixing chamber 23 and is acted upon only by air flowing through the evaporation device 5.

It is basically possible to produce the first mixing flap 11 as a planar flap designed symmetrically to the axis of rotation 43. In this case, the issue 41 can likewise be screened off completely with respect to the mixing chamber 23, so that only cold air can flow in here from the evaporation device 5. Moreover, it is possible in this embodiment, too, to adjust the first mixing flap 11 in such a way that the issue 41 is connected only to the mixing chamber 23 and is screened off with respect to direct action upon it by air from the evaporation device 5, to be precise because the first air flow path 21 is interrupted.

As regards the functioning of the mixing flaps 11 and 13 and of the regulated flaps 31 and 33 illustrated in the FIGURE, the following is also to be stated: the sectional illustration according to the FIGURE shows an inner side face of the air conditioner housing 1, into which side face a first orifice, to be precise the issue 41, and a second orifice, to be precise the first outlet 23, are introduced. The mixing and regulating flaps 11, 13, 31 and 33, and also their associated axes of rotation 43, extend perpendicularly to the inner face illustrated here and lie with a side edge on this inner face. The various flaps lie correspondingly with the side edge facing the observer on the opposite inner face of the air conditioner housing 1. This ensures that no air can flow laterally past the mixing and regulating flaps when they are intended to close the associated air paths. The flaps may in each case have sealing lips preferably on the side facing the inner face.

Correspondingly, the flaps 11, 13, 31 and 33 also seal off the air stream in defined functional positions with their longitudinal edges perpendicular to the image plane. For example, the second mixing flap 13 seals off, with an edge lying at bottom left, with respect to the wall 18 of the air conditioner housing 1 and, with an outer edge lying at top right, with respect to the wall region 19. In the functional position illustrated, the first mixing flap 11 seals off, with its upper right edge of the first mixing flap region 45, with respect to the wall 18 of the air conditioner housing 1 and, with its lower edge of the second mixing flap region 47, with respect to the wall region 19.

The selected length of the regulating flaps 31 and 33 is such that, as illustrated, these can span the width of the associated outlets 29 and 33 and with their sealing edges perpendicular to the image plane can seal off the latter. The regulating flaps 31, 33 may be designed as explained with reference to the first mixing flap 11.

It becomes clear from the explanations relating to the FIGURE that the second mixing flap 13 serves solely for influencing the second air flow path 25 which runs from the evaporation device 5 through the heating device 7 and which, after passing through the heating device 7, leads into the mixing chamber 23. The first mixing flap 11 influences the air stream from the evaporation device 5, said air stream leading into the mixing chamber 23 directly, that is to say without running through the heating device 7. By means of the two mixing flaps 11 and 13, it is thus possible to influence the quantity of air which passes from the evaporation device 5 directly into the mixing chamber 23 and, on the other hand, the air which passes from the evaporation device 5 into the mixing chamber 23 via the heating device 7. Thus, the second mixing flap 13 regulates the heat supply into the mixing chamber 23 and the first mixing flap 11 regulates the cold supply into said mixing chamber.

In addition, the first mixing flap 11 is provided for influencing the air fraction which passes through the issue 41 into the stratification duct 39. In this case, it is possible to introduce only cold air from the evaporation device 5 into the issue 41, while the latter is closed off with respect to the mixing chamber 23. In addition, the first mixing flap 11 can be set in such a way that air can pass both from the mixing chamber 23 and directly from the evaporation device 5 into the issue 41.

Finally, it is conceivable to design the first mixing flap 11 in such a way that it has two mixing flap regions 45 and 47 which are designed in a manner of a segment of a circle and afford the possibility of closing off the issue 41 completely, so that no air from the evaporation device 5 and also no air from the mixing chamber 23 can enter the issue 41 and consequently the stratification duct 39. It also becomes apparent here that the first mixing flap 11 may have, on the one hand, a planar plate and, on the other hand, an element in the manner of a segment of a circle serving as a mixing flap region, that is to say said first mixing flap does not have to be designed symmetrically. In this case, there can still be the possibility of closing of the issue 41 completely.

It ultimately becomes clear that the first air conditioner housing 1 is so designed and has such an air control device 9 that cold air flowing around from the evaporation device 5 can be conducted, without heating into the mixing chamber, and that air can be led from the evaporation device 5 into the mixing chamber via the heating device 7. By means of mixing flaps 11 and 13 of the air control device 9 which are assigned to the two air flow paths 21 (cold air) and 25 (heated air), air heated to a greater or lesser extent can be conducted into the mixing chamber 23, as is customary, and supplied to the foot space and to the ventilation of the front region and the region at the rear part of a vehicle. Owing to the arrangement of a stratification duct 39 which has an issue 41 in the region of one of the mixing flaps of the air control device 9, temperature stratification can be achieved in the region of the rear part. As a result of the interaction of the issue 41 with the second mixing flap 13, more or less cold air can be supplied from the evaporation device 5 through the stratification duct 39 to the ventilation of the rear part which, moreover, is supplied with air from the mixing chamber 23 via the fourth outlet 37.

As may be gathered from the description, it is advantageous that the ventilation of the rear part can be acted upon by cold air, without the need to arrange in the air stream any air guide ribs which lead to the generation of noise and reduce the air quantity discharged. It is therefore possible, by virtue of the interaction of the first mixing flap 11 with the issue 41 of the stratification duct 39, to make available a larger air quantity, along with a lower generation of noise, for temperature stratification in the region of the rear part of a motor vehicle.

It is apparent, moreover, that, by virtue of the arrangement, selected here, of the issue 41 of the stratification duct 39, temperature stratification is achieved without any additional fittings. The two mixing flaps 11 and 13 are in any case present for setting the air in the mixing chamber 23. Thus, only the arrangement, illustrated here, of the issue 41 in the range of action of the first mixing flap 11 is required in order to achieve the temperature stratification described.

Similarly, it is basically conceivable also to arrange the issue 41 in the region of the second mixing flap 13, thereby affording, here too, the possibility of introducing more or less cold air from the evaporation device 5 into the issue 41 and consequently into the stratification duct 39. It is clear from FIG. 1, however, that the second mixing flap 13 has only a limited pivoting range on account of the spatial conditions. It is consequently not readily possible to implement all the functions which are possible in the case of the arrangement of the issue 41 in the region of the first flap 11. The embodiment, illustrated here, of the air conditioner housing 1 was therefore also preferred.

The invention claimed is:

1. An air conditioner housing, comprising:
   an evaporation device,
   a heating device,
   a single mixing chamber configured to supply ventilation to both front and rear regions of a vehicle, and
   an air control device,
   wherein air flows out of the mixing chamber to foot space of a rear part and to ventilation the rear region, and
   wherein the air control device comprises a first mixing flap and a second mixing flap to control air flowing through the evaporation device and the heating device into the mixing chamber, and
   wherein the air control device further comprises a separate stratification duct through which cool air can be led to supply ventilation to the rear region.

2. The air conditioner housing as claimed in claim 1, wherein the stratification duct comprises an issue arranged near the first mixing flap.

3. The air conditioner housing as claimed in claim 2, wherein in one functional position of the first mixing flap, the issue of the stratification duct is connected only to the mixing chamber or can be acted upon only by air delivered by the evaporation device.

4. The air conditioner housing as claimed in claim 2, wherein in one functional position of the first mixing flap, the issue of the stratification duct is closed off by said first mixing flap both with respect to the mixing chamber and with respect to cold air delivered by the evaporation device.

5. The air conditioner housing as claimed in claim 2, wherein the issue and first mixing flap allow temperature stratification in the rear region of the vehicle.

6. The air conditioner housing as claimed in claim 2, wherein the issue interacts with the second mixing flap to adjust cold air from the evaporation device, through the stratification duct, and to the rear region of a vehicle.

7. The air conditioner housing as claimed in claim 1, wherein the mixing flaps allow cold air to flow around the evaporation device and into the mixing chamber without heating.

\* \* \* \* \*